US008001342B2

(12) United States Patent
Armstrong et al.

(10) Patent No.: US 8,001,342 B2
(45) Date of Patent: Aug. 16, 2011

(54) METHOD FOR STORING AND RESTORING PERSISTENT MEMORY CONTENT AND VIRTUAL MACHINE STATE INFORMATION

(75) Inventors: William Joseph Armstrong, Rochester, MN (US); Alain Charles Azagury, Haifa (IL); Shmuel Ben-Yehuda, Haifa (IL); Eliezer Dekel, Haifa (IL); Michael E. Factor, Haifa (IL); Amiram Hayardeny, Binyamina (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/392,530

(22) Filed: Mar. 29, 2006

(65) Prior Publication Data

US 2007/0239804 A1 Oct. 11, 2007

(51) Int. Cl.
*G06F 12/16* (2006.01)
*G06F 11/00* (2006.01)

(52) U.S. Cl. .................. 711/162; 714/6.11; 714/15
(58) Field of Classification Search .............. 711/6, 162, 711/163; 714/6.11, 15; 707/549, 653
See application file for complete search history.

(56) References Cited

U.S. PATENT DOCUMENTS

| 6,088,773 | A  | * | 7/2000 | Kano et al. ................. 711/161 |
| 6,718,538 | B1 | * | 4/2004 | Mathiske .................... 717/129 |
| 6,795,966 | B1 |   | 9/2004 | Lim et al. |
| 6,839,892 | B2 |   | 1/2005 | Dawkins et al. |
| 7,093,086 | B1 | * | 8/2006 | van Rietschote ............ 711/161 |
| 7,213,246 | B1 | * | 5/2007 | van Rietschote et al. ......... 718/1 |
| 7,266,637 | B1 | * | 9/2007 | van Rietschote ............ 711/112 |
| 7,373,530 | B2 | * | 5/2008 | Judge et al. ................... 713/300 |
| 7,529,897 | B1 | * | 5/2009 | Waldspurger et al. ........ 711/162 |
| 7,774,391 | B1 | * | 8/2010 | Le et al. ........................ 707/822 |
| 2002/0174265 | A1 | * | 11/2002 | Schmidt ........................ 709/328 |
| 2004/0168030 | A1 | * | 8/2004 | Traversat et al. .............. 711/133 |
| 2005/0066118 | A1 |   | 3/2005 | Perry et al. |
| 2005/0071537 | A1 | * | 3/2005 | New et al. ..................... 711/100 |
| 2005/0160423 | A1 | * | 7/2005 | Bantz et al. ..................... 718/1 |
| 2005/0193272 | A1 |   | 9/2005 | Stager et al. |
| 2006/0218544 | A1 | * | 9/2006 | Chakraborty et al. ........ 717/168 |
| 2007/0005919 | A1 | * | 1/2007 | van Riel ....................... 711/163 |
| 2007/0220298 | A1 | * | 9/2007 | Gross et al. ..................... 714/2 |

OTHER PUBLICATIONS

Agbaria et al., "Virtual Machine Based Heterogeneous Checkpointing," IEEE, 2002, pp. 1-6.*
Jon Howell,"Straightforward Java Persistence Through Checkpointing", Department of Computer Science, Dartmouth College, Hanover, Aug. 6, 1998.
Samuel T. King et al., "Debugging operating systems with time-traveling virtual machines", 2005 USENIX Annual Technical Conference, Apr. 2005.
Y. Huang et al., "Components for Software Fault Tolerance and Rejuvenation", Bell Labs Technical journal, vol. 75, No. 2, Apr. 1996, pp. 29-37.

* cited by examiner

*Primary Examiner* — Shane M Thomas

(57) ABSTRACT

A method that can simplify a recovery of a system. The method includes storing multiple types of information, and includes: a first stage of storing information representative of a content of a persistent memory entity at a certain point in time; and a second stage of storing information representative of a state of a virtual machine at the certain point in time; and recovering a system that associates between the first stage of storing information and the second stage of storing information.

17 Claims, 10 Drawing Sheets

| LOGICAL BLOCK ADDRESS | TIME | PHYSICAL ADDRESS |
|---|---|---|
| 12 | 10 | a |
| 12 | 30 | b |
| 12 | 40 | c |
| 12 | 60 | d |
| 12 | 90 | e |
| 12 | 110 | f |

First control table 200

| ID | START TIME | END TIME | REVERT TO TIME |
|---|---|---|---|
| 10 | 10 | 10 | a |
| 30 | 30 | 30 | b |
| 40 | 40 | 40 | c |

Second control table 250

Figure 6

METHOD FOR STORING AND RESTORING PERSISTENT MEMORY CONTENT AND VIRTUAL MACHINE STATE INFORMATION

FIELD OF THE INVENTION

The present invention relates to methods, systems and computer program products that store multiple types of information.

BACKGROUND OF THE INVENTION

Various continuous data protection (CDP) methods and systems were developed in order to store and restore the content of persistent storage units. U.S. patent application publication serial No. 2005/0066118 of Perry et al., and U.S. patent application publication serial No. 2005/0193272, all being incorporated herein by reference, describe prior art devices and method for continuous data protection.

Virtual machines isolate an operating system from the computer platform that is used to execute the operating system. Operating systems running inside virtual machines can be executed by different computer platforms.

A single computer platform can support multiple virtual machines concurrently. Such a computer platform is commonly referred to as a logically partitioned platform. Each operating system or instance of an operating system is assigned a non-overlapping subset of the computer platform.

Typically, the multiple virtual machines are controlled by a hypervisor. The hypervisor can manage and enforce partition protection boundaries. See, for example, U.S. Pat. No. 6,839,892 of Dawking et al., which is incorporated herein by reference.

The state of a virtual machine can be stored (and restored) by using virtual machine check-pointing. The state of a virtual machine can be at least partially temporarily stored within various volatile memory units such as internal registers of the computer platform.

Due to the time gaps between CDP storage operations and between virtual machine snapshot operations the overall state of the computer platform at certain times is either unknown or requires relatively excessive restore operations.

There is a growing need to provide devices, computer program products and methods that will enable efficient restoration of information.

SUMMARY OF THE PRESENT INVENTION

A method for storing multiple types of information, the method includes: storing information representative of a content of a persistent memory entity at a certain point in time; and storing information representative of a state of a virtual machine at the certain point in time.

Conveniently, the method includes preventing an update of the persistent memory entity during the stages of storing information.

Conveniently, the method includes preventing a change in the state of the virtual machine during the stages of storing information.

Conveniently, the method includes monitoring a virtual machine and initiating the stage of storing information representative of the content of the persistent memory entity in response to a virtual machine state freeze.

Conveniently, the method includes synchronizing between the storing of information representative of the content of the persistent memory entity and the storing of information representative of a state of the virtual machine in response to storage periods associated with each of these storing.

Conveniently, the method includes associating the information representative of the content of the persistent memory unit at the certain point in time with the information representative of the state of the virtual machine at the certain point in time.

Conveniently, the method includes restoring a content of the persistent memory entity and restoring the state of the virtual machine in response to the stored information representative of the content of the persistent memory entity at the certain point in time and the stored information representative of the state of the virtual machine at the certain point in time.

BRIEF DESCRIPTION OF THE DRAWINGS

The present invention will be understood and appreciated more fully from the following detailed description taken in conjunction with the drawings in which:

FIG. 6 illustrates two exemplary data structures, according to an embodiment of the invention;

DETAILED DESCRIPTION OF THE DRAWINGS

Figure 1:
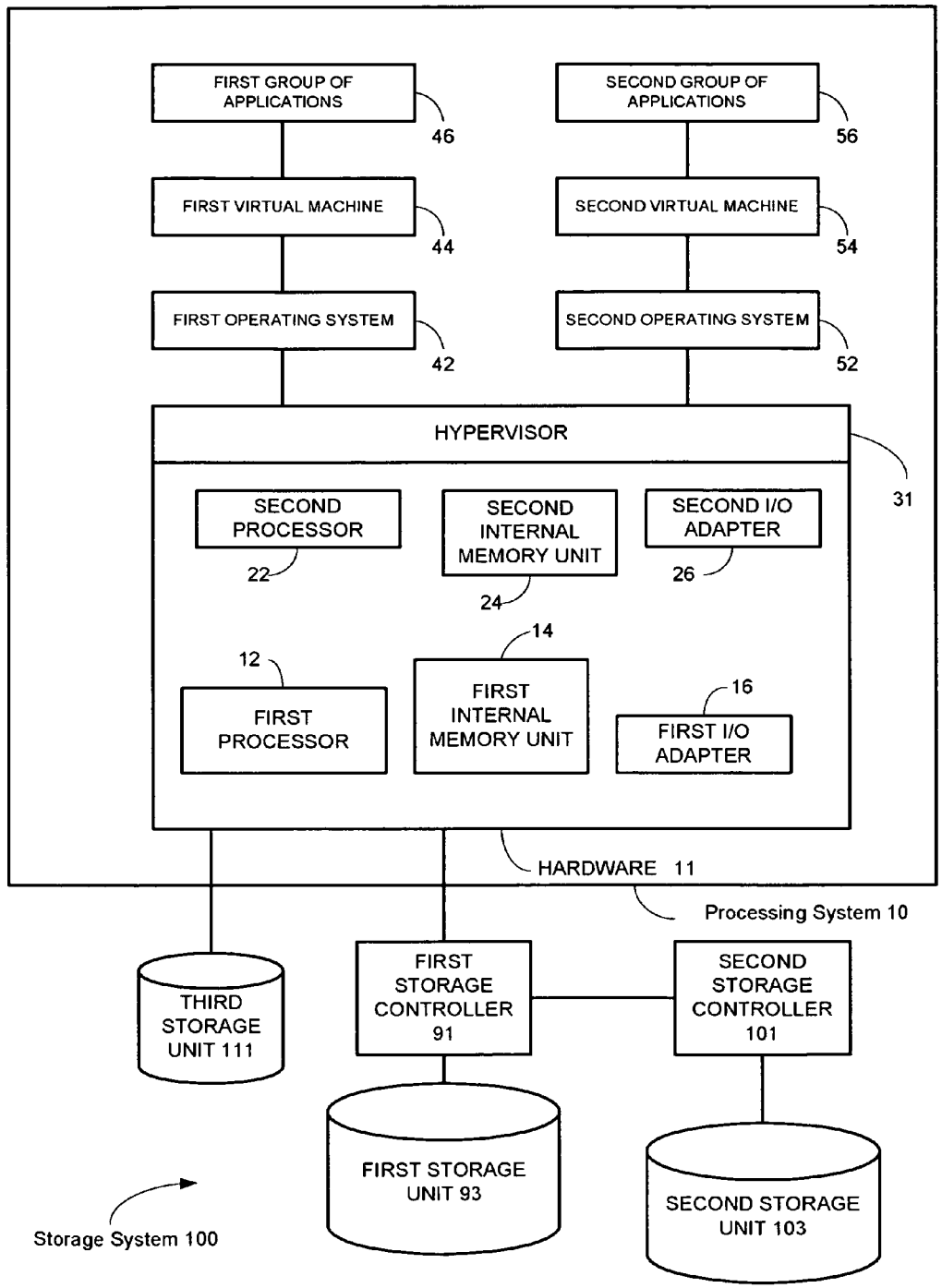
FIG. 1 illustrates a processing system and a storage system, according to an embodiment of the invention.

Conveniently, a system is provided. The system includes at least one storage unit and a controller that is adapted to control a storage operation of information representative of the content of a persistent memory entity at a certain point in time; and to control a storage operation of information representative of a state of a virtual machine at the certain point in time. The controller can include hardware, software, firmware or a combination thereof. The controller can include, for example, one or more storage controllers, one or more processors, one or more virtual machines, one or more hypervisors, one or more checkpointing layers, and the like. A persistent memory entity is a computer-usable or computer-readable medium or a portion of a computer-usable or computer-readable medium that is used for storing relatively long-term information.

Conveniently, the storage operation of information representative of the content of a persistent memory entity and the storage operation of information representative of a state of a virtual machine are mutually independent. These storage operations can be managed by different entities. Conveniently, the controller synchronizes between these two storage operations.

Conveniently, a method is provided. The method includes storing information representative of the content of a persistent memory entity at one point in time and storing information representative of a state of a virtual machine at substantially the same point in time.

According to an embodiment of the invention the method includes storing information representative of the contents of one or more persistent memory entities at one or more points in time and storing information representative of one or more states of one or more virtual machines at substantially the same points in time.

The information representative of the state of a virtual machine (or the content of a persistent memory entity) can be the state (content) itself but this is not necessarily so as long as that information, and optionally additional information, can be used to reconstruct the state of the virtual machine (the content of the persistent memory entity) at one or more points in time. For example, stored information representative of a state of a virtual machine at a certain point in time can be further compared to older information, decoded, de-compressed and the like in order to reconstruct the state of the virtual machine at that point in time.

According to an embodiment of the invention the content of the persistent memory entity represents a state of multiple virtual machines.

According to an embodiment of the invention the content of the persistent memory entity includes information that differs from a state of a virtual machine.

The first storage operation can also be referred to as a CDP storage operation or a CDP snapshot while the second storage operation can also be referred to as a virtual machine check-pointing operation or a virtual machine state snapshot operation.

The recovery of a system that associates between CDP storage operations and virtual machine check-pointing operations greatly simplifies the recovery of the system. This is especially true when both operations store substantially the entire state of the system.

There is usually a trade off between the amount of information representative of a state or a virtual machine or of a content of a persistent storage entity that can be stored and the complexity (or length) of a restoring operation that restores the state of the virtual machine or the of a content of a persistent storage entity. Different tradeoffs can be made without departing from the spirit of the invention.

The first storage operation can be implemented by various well-known CDP devices, methods of software. One of these well known CDP software is the Tivoli™ software of International Business Machine Corporation® of New York.

Conveniently, one storage operation can trigger (or otherwise affect) the second storage operation. For example, one storage operation can be initiated when another storage operation begins or ends.

Each of the storage operations can be executed in response to a predefined storage scheme. The storage scheme can include repetitive storage operations, events that trigger storage operations, continuous storage operations, pseudo-random storage operations and the like. The storage points in time can be determined by one or more applications, an end user, by one or more virtual machines, by a hypervisor, or by a combination of any of them.

According to an embodiment of the invention one storage operation is more time consuming then the other. Thus, in order to store snapshots of substantially the same time some of the operations of the system can be halted until the longer storage operation is completed.

In some cases multiple storage operations of one type can be executed while a single storage operation of another type is executed. Conveniently, one or more of the multiple storage operations is associated with the second storage operation.

According to an embodiment of the invention the various storage operations are listed (or represented in another manner) in one or more one or more data structures. These data structures are conveniently stored outside the persistent memory entity and outside volatile memory entities that store at least a portion of the state of a virtual machine. Conveniently, multiple copies of these data structures are generated.

The second storage operation can be executed by an intermediate software layer located between the operating system and the hypervisor, but this not necessarily so. Such an intermediate software layer is described in "Straightforward Java Persistence Through Checkpointing", Jon Howell, Department of Computer Science, Dartmouth College, Hanover, Aug. 6, 1998, which is incorporated herein by reference.

According to an embodiment of the invention the storage of information representative of the content of a persistent memory entity is internally consistent. For example, if a file system spans multiple volumes, its snapshot should be internally consistent across all of the volumes.

According to various embodiments of the invention information representative of the state of multiple virtual machines can be stored in the same persistent storage entity. The content of the persistent storage entity can be stored, as well as information representative of the state of each of the virtual machines.

FIG. 1 illustrates processing system 10 and storage system 100 according to an embodiment of the invention.

For simplicity of explanation FIG. 1 illustrates two virtual machines, and two sets of hardware components such as processors, internal memory units and IO adapters. It is noted that the number of hardware components of the same kind can exceed two and that the number of virtual machines that can concurrently run can exceed two. Conveniently, the number of virtual machines differs from the number of processors, but this is not necessarily so. For example, a single processor can support multiple virtual machines.

It is further noted that the hypervisor is optional, especially in systems that support a single virtual machine.

Those of skill in the art will appreciate that embodiments of the invention can be applied on various processing systems (including distributed processing systems) and various storage systems with out departing from the spirit of the invention. The processing system can be a host computer or server, but this is not necessarily so. The processing system and the storage system can be integrated with each other, remotely positioned from each other, connected directly or indirectly to each other and the like.

Processing system 10 includes hardware 11, hypervisor 31 and two partitions. The first partition includes a first operating system 42, a first virtual machine 44 and a first group of applications 46. The second partition includes a second operating system 52, a second virtual machine 54 and a second group of applications 56.

Hardware 11 includes a first processor 12, a first internal memory unit 14, a first input output (I/O) adapter 16, a second processor 22, a second internal memory unit 24, and a second input output (I/O) adapter 26. Usually. First processor 12, first internal memory unit 14 and first I/O adapter 16 cooperate with each other and can operate independently of the second processor 22, second internal memory unit 24, and the second I/O adapter 26.

Conveniently, the hypervisor 31 (also referred to as partition management firmware) is adapted to control the usage of various hardware components by the first and second partitions.

For example, the hypervisor can enable the first operating system 42 (and accordingly the first virtual machine 44) to utilize the first processor 12, a first internal memory unit 14 and the first I/O adapter 16, while the second operating system 54 uses the second processor 22, second internal memory unit 24, and the second I/O adapter 26.

Conveniently, the hypervisor 31 can control the storage operations or can allow another entity (such as one virtual machines 44 and 54) to control the storage operations. The control can be implemented by sending control signals and/or commands between the different components.

The storage system 100 can store information representative of the content of a persistent memory entity at a certain point in time and store information representative of a state of a virtual machine at that certain point in time.

Storage system 100 includes a first storage controller 91 that controls the storage operations to first storage unit 93. The first storage unit 93 can be regarded as a persistent memory entity. It can be utilized by both the first and second virtual machines 44 and 54.

In addition, the storage system 100 includes a third storage unit 111 for storing snapshots of the first virtual machine 44 and for storing snapshots of the second virtual machine 54. It is noted that different storage units can be provides for storing snapshots of different virtual machines. This latter option is further illustrated in FIG. 2.

The storage system 100 also includes a second storage controller 101 that is connected between the first storage controller 91 and a second storage unit 103. The second controller 101 control storage operations of the second storage unit 103. The second storage unit 102 can store snapshots of the first storage unit 93.

Those of skill in the art will appreciate that each of the components of the storage system 100 can include multiple hardware, firmware and/or software components. For example, each storage unit out of storage units 93, 103 and 113 can include one or more tapes, one or more disks, and the like.

It is further noted that the storage system 100 can have a centralized or distributed architecture. For example, one or more components can be connected to each other over a network and/or via one or more intermediate components.

It is noted that the first storage operation (the storage of information representative of a content of a persistent memory entity) and the second storage operation (the storage of information representative of a state of a virtual machine at the certain point in time) can be executed simultaneously, but this is not necessarily so. The timing of these storage operations should occur in a manner that enables to restore the state of the virtual machine and the content of the persistent memory entity at same time.

Assuming, for example, that the state of the first virtual machine 44 and the content of the persistent memory do not change between point in time T1 and point in time T2. Accordingly, information representative of the content of a persistent memory entity at any time between T1 and T2 can be associated with information representative of the state of the virtual machine at ant time between T1 and T2. Thus, the two storing stages do not necessarily have to store information related to the same point in time.

The storage operations can be initiated or otherwise controlled by hypervisor 31 or one of the virtual machines (44 or 54). These storage operations also include storing information representative of the content of the first storage unit 93.

According to another embodiment of the invention during the stage of storing information representative of the state of a virtual machine that virtual machine state is not allowed to be changed. The virtual machine can be prevented from writing to certain registers, to one of the internal memory units or even to the first storage unit 93. The first storage controller 91 can monitor the activities of that virtual machine and when it determines that the virtual machine state is frozen—is can initiate a storage operation of the content of the first storage unit 93.

Conveniently, the state of a virtual machine is stored (at least partially) in volatile memory (such as but not limited to the first and second internal memory units 14 and 24). According to an embodiment of the invention the two storage operations store an entire image of the state of processing system 100. Thus, the content of various memory units including files, registers, caches, main memory and disk contents are stored.

By storing multiple types of information the recovery of the processing system 10 can be relatively quick and simple. This can eliminate the need to perform multiple time-consuming application specific recovery.

Figure 4:
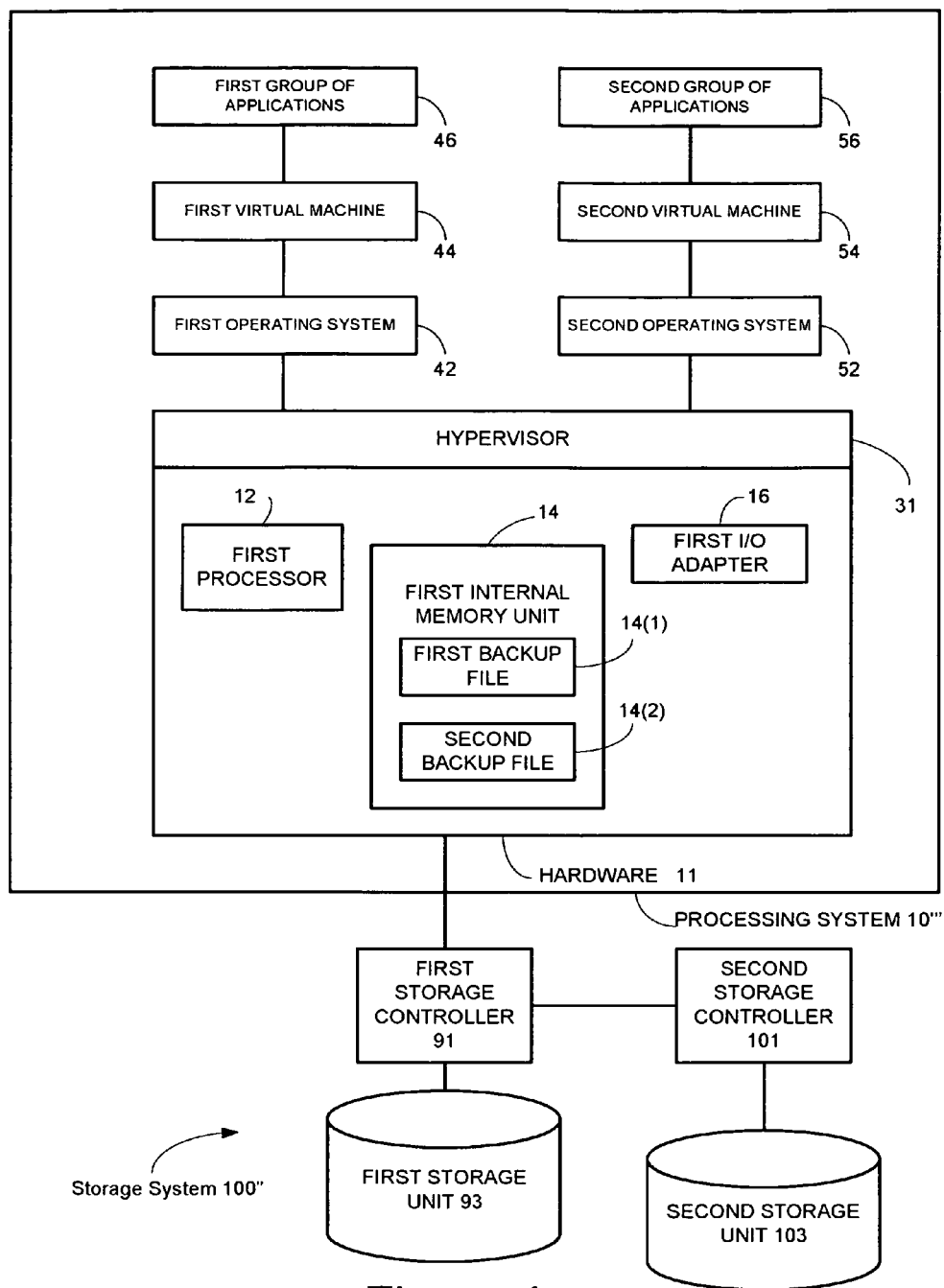
FIG. 4 illustrates a processing system and a storage system, according to yet another embodiment of the invention.

It is noted that although FIG. 1 illustrates a persistent memory entity as including the first storage unit 93 this is not necessarily so. For example, FIG. 4 illustrates a processing system 100''' in which the persistent memory entity is a file (first backup file 14(1)) within the first internal memory unit 14. Processing system 100''' is connected to a storage system 100" that resembles storage system 100 of FIG. 1 but does not includes the third storage unit 111. In general, this storage operation can include performing a CDP snapshot, executing a point-in-time copy of a file system, performing an LVM snapshot of a block device backing a virtual machine, performing a FlashCopy of a storage controller volume, or any other realization of creating an internally consistent copy of whatever the VM is using as persistent memory entity.

It is noted that storing information representative of the content of a persistent memory entity can use continuous or differential (incremental) storage techniques. Thus, at a first point in time the content of a persistent memory entity can be copied. At a second point in time only differences between the content of the persistent memory entity at the first point in time and the content of the same persistent memory entity at the second point in time is stored. It is noted that differential storage techniques can also be applied during the storage of information representative of the content of a persistent memory entity.

According to an embodiment of the invention the content of the first storage unit 93 is very frequently or even continuously stored at the second storage unit 103. These very frequent (or even continuous) storage operations are controlled by the second storage controller 101. It is noted that a storage operation can be initiated whenever a certain amount of information is sent to the first storage unit 93.

Typically, the stage of storing the state of the first virtual machine 44 (or the second virtual machine 54) is executed less frequently. These storage operations can occur at predefined points in time or in response to certain events or in a combination of both. Once such a storage operation occurs the processing system 10 or the storage system 100 associated between The storage of information representative of a state of a virtual machine can be done in an incremental fashion while the user continues working. It can involve repetitively copying one or more memory pages that were changed after a previous copy operation, until the copying process converges. Once the copying process converges the virtual machine is stopped and the changed memory pages are sent towards the storage system 100.

When the last few pages are written to disk, a record is also made on some external storage that correlates the VM snapshot with the disk backup status. This record must be made outside of the checkpointed system, e.g. by the hypervisor or the control partition.

Figure 2:
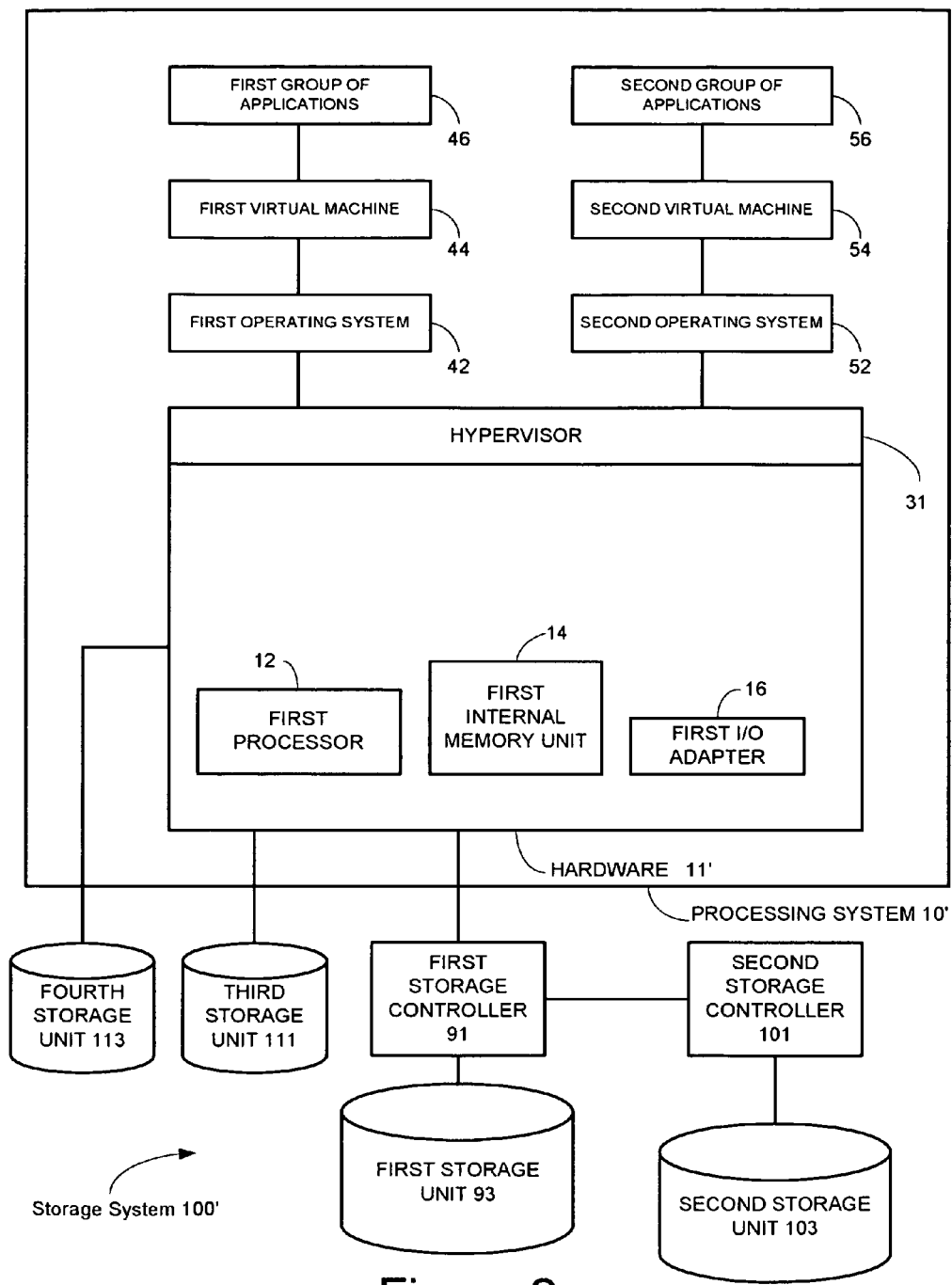
FIG. 2 illustrates a processing system and a storage system, according to another embodiment of the invention.
Figure 3:
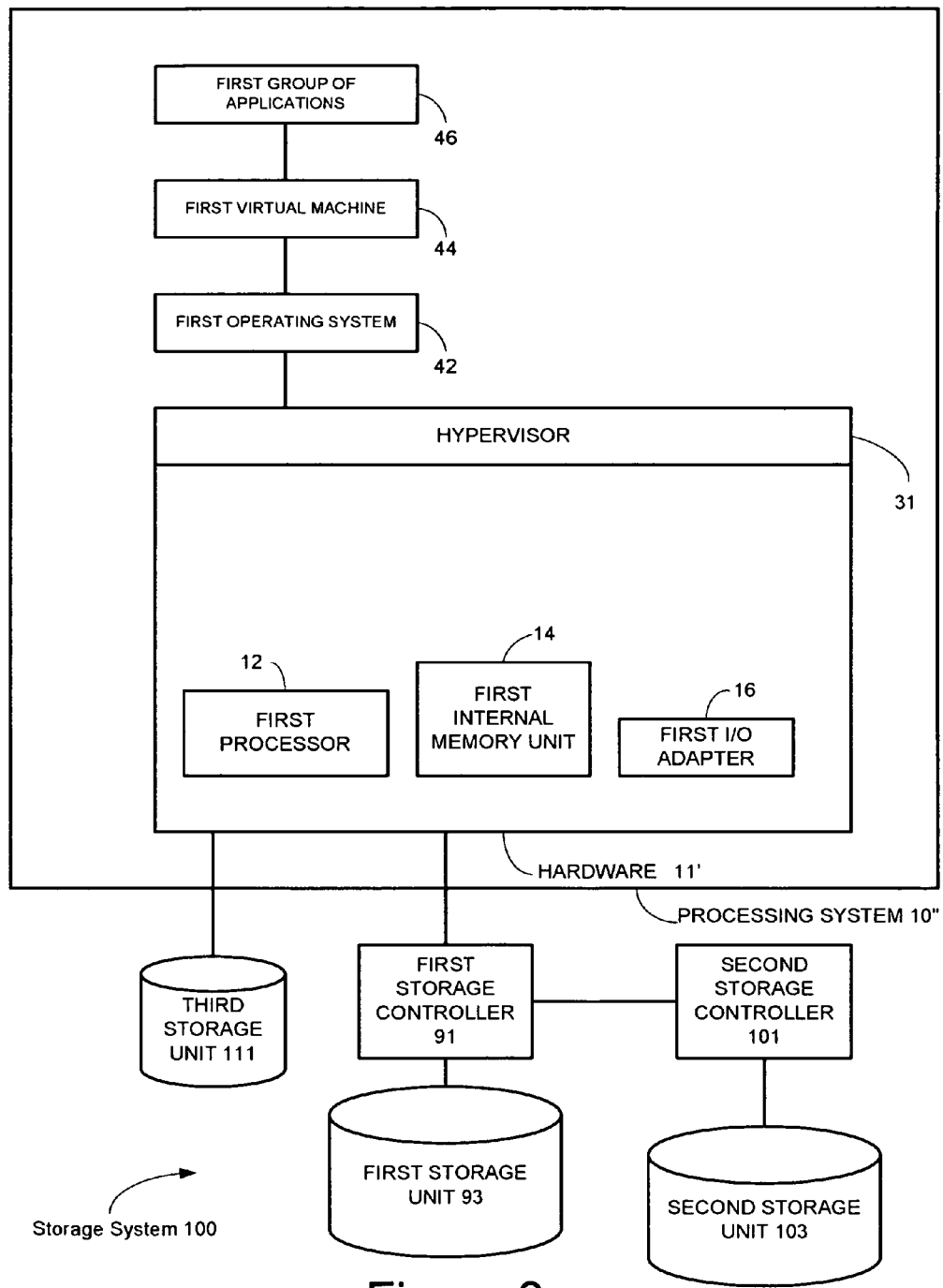
FIG. 3 illustrates a processing system and a storage system, according to a further embodiment of the invention.

FIG. 2 illustrates a processing system 10' and a storage system 100' according to another embodiment of the invention. FIG. 3 illustrates processing system 10" and storage system 100 according to a further embodiment of the invention.

Processing system 10" differs from processing system 10 of FIG. 1 by not including second processor 22, second internal memory unit 24 and second I/O adapted 26.

Storage system 100' differs from storage system 100 of FIG. 1 by further including a fourth storage unit 113. The state of the first virtual machine 44 is stored at the third storage unit 111 while the state of the second virtual machine 54 is stored at the forth storage unit 113. It is noted that this is not necessarily so. For example, the state of the first virtual machine 44 can be stored at the fourth storage unit 113 while the state of the second virtual machine 54 is stored at the third storage unit 111.

Figure 5:
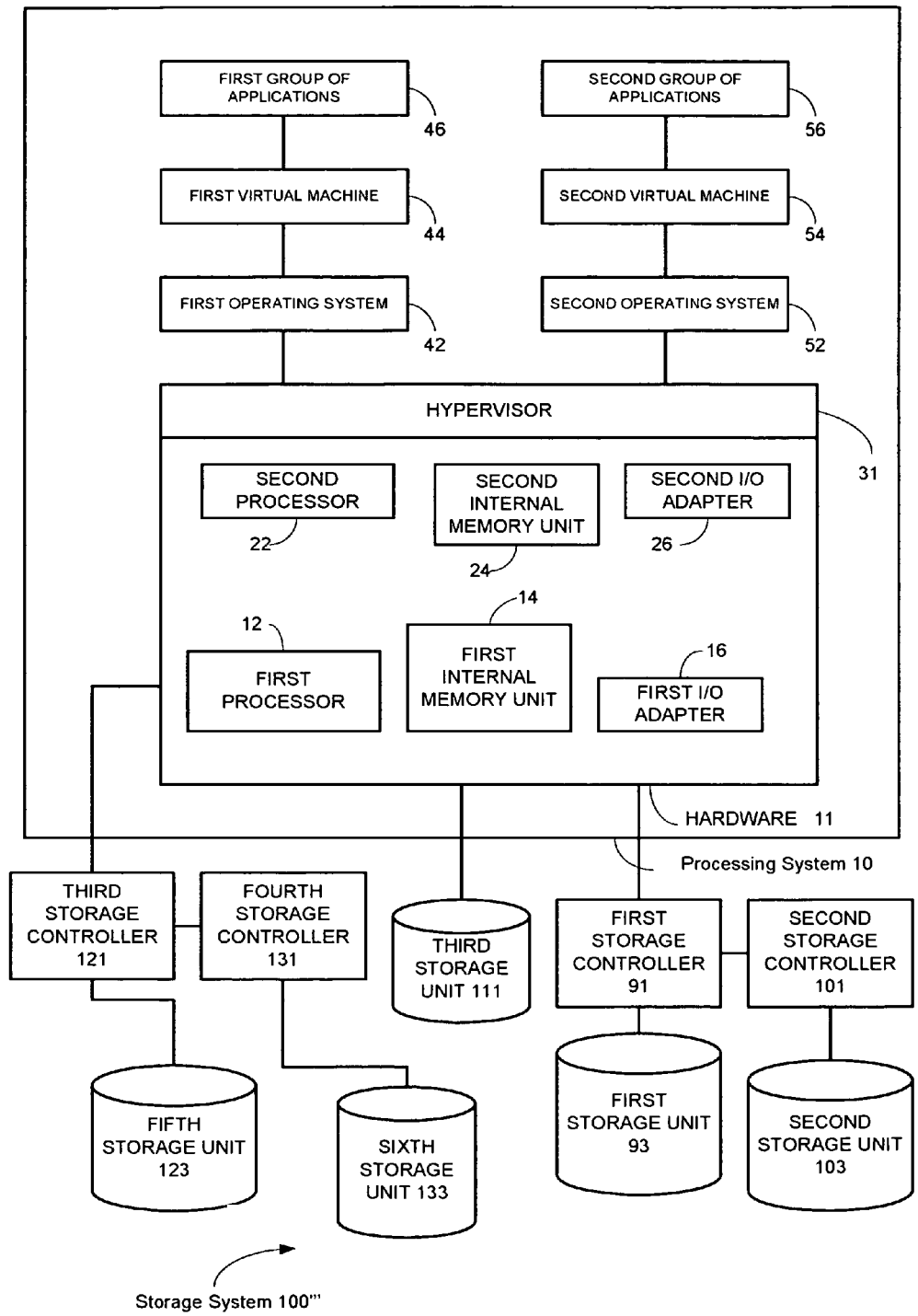
FIG. 5 illustrates a processing system and a storage system, according to yet a further embodiment of the invention.

FIG. 5 illustrates processing system 10 and storage system 100''' according to yet a further embodiment of the invention.

The storage system 100''' differs from storage system 100 of FIG. 1 by including a third storage controller 121, a forth storage controller 131, a fifth storage unit 123 and a sixth storage unit 133.

The third storage controller 121 is connected to hardware 11, forth storage controller 131 and fifth storage unit 123. The fourth storage controller 131 is further connected to the sixths storage unit 133.

The third storage controller 121 controls the storage operations to fifth storage unit 123. The fifth storage unit 123 can be regarded as a persistent memory entity. It can be utilized by both the first and second virtual machines 44 and 54.

The fourth storage controller 131 controls storage operations of the sixth storage unit 133. The sixth storage unit 133 can store snapshots of the fifth storage unit 123.

Conveniently, the system can enable distributed checkpoints with shared storage. The system includes multiple physical machines that support multiple virtual machines. The state of the multiple virtual machines is stored within a shared persistent memory entity. The state of each virtual machine can be check-pointed and the content of the shared persistent memory entity is also stored.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 7:
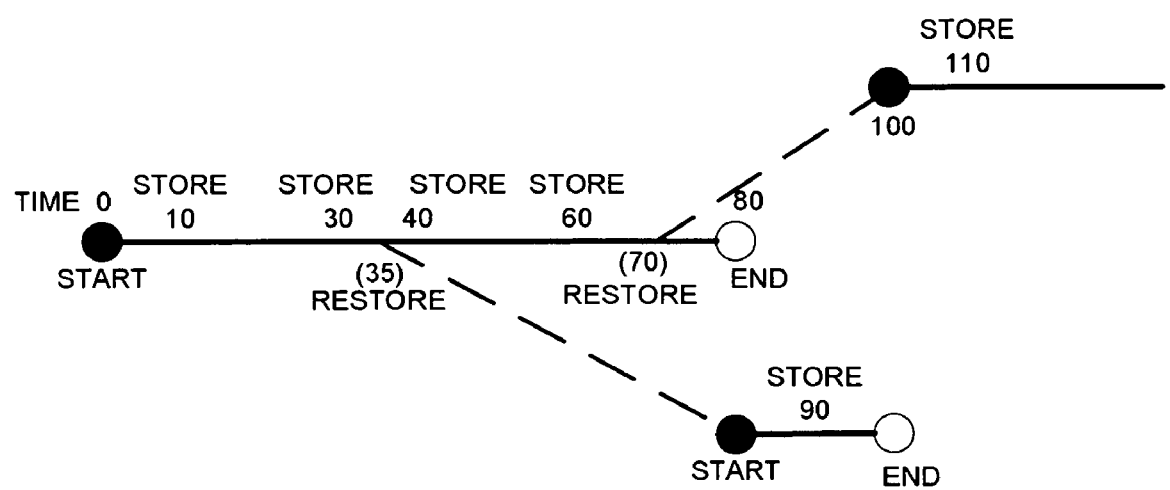
FIG. 7 illustrates an exemplary sequence of storage and reconstruction operations, according to an embodiment of the invention.

FIG. 6 illustrates two exemplary data structures 200 and 250, according to an embodiment of the invention. FIG. 7 illustrates an exemplary sequence of storage and restoration operations, according to an embodiment of the invention. The content of data structures 200 and 250 is illustrated in view of the exemplary sequence of storage and restoration events.

According to an embodiment of the invention two data structures, such as but not limited to control tables 200 and 250, are used to track storage operations and restore operations. These storage and restore operation can relate to the content of a persistent memory entity, but this is not necessarily so.

The sequence of storage and restore operations includes multiple branches. Each branch terminates when a restore request is accepted. The branch can starts at an initialization stage of the sequence (for example at point in time T=0) or when a restore request is accepted and executed.

The first control table 200 includes three columns 200(1), 200(2) and 200(3). Each entry includes information about a single storage operation. The first column 200(1) includes the logical block address of the storage operations, the second column 200(2) includes the time of storage operation, and the third column 200(3) includes the physical address of the storage operation. The logical block address and the time of storage fields can be used as an index to the first control table 200(1).

The second control table 250 includes four columns 250(1)-250(4). The first column 250(1) includes restore identification numbers, the second column 250(2) includes start times of branches, the third column 250(3) includes the end times of these branches and the fourth column 250(4) includes the restore point in time.

Control tables 200 and 250 are adapted to control a sequence of storage and restore operations in which one branch is active at each given point in time. In order to support multiple concurrent branches these tables should be modifies to include branch identification information.

FIG. 7 illustrates an exemplary sequence includes storage operations of a content of a persistent memory entity at times 10, 30, 40, 60, 90 and 110, and requests (received at times 80 and 100) to restore the content of the persistent memory entity at times 35 and 70 accordingly.

Dashed lines represent the restore operation. It is noted that only one branch is active at any given point in time.

It is assumed that the storage operations were aimed to logical block address 12 and that the physical addresses associated with these storage operations were a, b, c, d, e and f accordingly.

The first column 200(1) of the first control table 200 indicates that all the storage operations were to logical block address 12. The second column 200(2) of the first control table 200 indicates that the storage operations occurred at times 10, 30, 40, 60, 90 and 110. The third column 200(3) of the first control table 200 indicates that the physical addresses associated with these storage operations were a, b, c, d, e and f.

The first entry of the second control table 250 indicates that a first branch started at time 0 and ended at time 80. The first branch ended when a first request to restore the content of a persistent memory entity was accepted.

The second entry of the second control table 250 indicates that a second branch started at time 80 and ended at time 100. The second branch ended when a second request to restore the content of a persistent memory entity was accepted.

The third entry of the second control table 250 indicates that a third branch started at time 100 and did not end.

Figure 8:
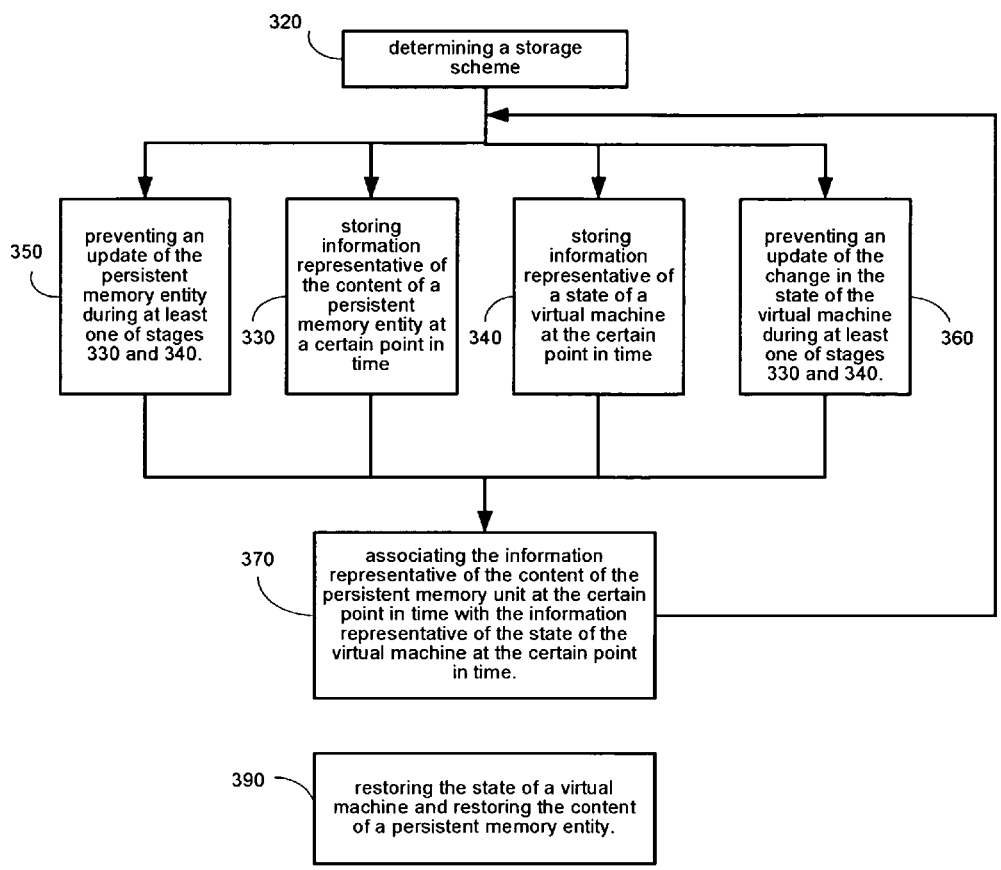
FIG. 8 illustrates a method for storing multiple types of information, according to an embodiment of the invention.

FIG. 8 illustrates a method 300 for storing multiple types of information, according to an embodiment of the invention.

Method 300 starts by stage 320 of determining a storage scheme. The storage scheme can include one or more repetitions of various stages of method 300 (such as stages 330 and 340). These repetitions can generate stored information representative of a state of a virtual machine and of a content of a persistent memory entity during multiple points in time.

It is noted that stage 320 can include timing the different storage operations in response to storage periods associated with each of these storing. Thus, the storage scheme facilitates synchronizing between storage operations of different types. A storage period represents the time that is required for successfully completing a storage operation such as a storage operation of information representative of the content of a persistent memory entity at a certain point in time, or a storage operation of information representative of a state of a virtual machine at the certain point in time. For example, if one storage operation is much longer than the other then the shorter storage operation can be initiated after the longer storage operation starts.

Stage 320 is followed by one or more repetitions of multiple stages such as stages 330, 340 and 370.

Stage 330 includes storing information representative of the content of a persistent memory entity at a certain point in time. Conveniently, the persistent memory entity can be a hardware component, a data structure or a combination of both.

Stage 330 can include storing a content of a persistent storage entity that is shared by multiple virtual machines and storing information representative of the state of each virtual machine.

Stage 330 can include storing a content of a persistent storage entity that includes information that differs from the state of a virtual machine.

Stage 340 includes storing information representative of a state of a virtual machine at the certain point in time.

Conveniently, stages 330 and 320 are mutually independent, and method 300 merely coordinates between these storage stages.

Conveniently, stage 320 is also followed by stage 350 of preventing an update of the persistent memory entity during at least one of stage 330 and 340.

Conveniently, stage 320 is also followed by stage 360 of preventing an update of the change in the state of the virtual machine during at least one of stage 330 and 340.

According to various embodiments of the invention stages 330 and/or stage 340 is initiated by a virtual machine, a hypervisor or a data storage entity.

Stage 330 and 340 are either followed by (as illustrated in FIG. 8) or at least are executed in parallel to stage 370 of associating the information representative of the content of the persistent memory unit at the certain point in time with the information representative of the state of the virtual machine at the certain point in time. Stage 370 is followed by stages 330-360, in response to the storage scheme defined in stage 320.

Method 300 can further include stage 390 of restoring the state of a virtual machine and restoring the content of a persistent memory entity. The restoration can occur after a failure, in response to a request or in response to another event. If the stored information enables to restore the state at multiple points in time the restoration includes selections a point in time out of multiple possible points in time.

Figure 9:
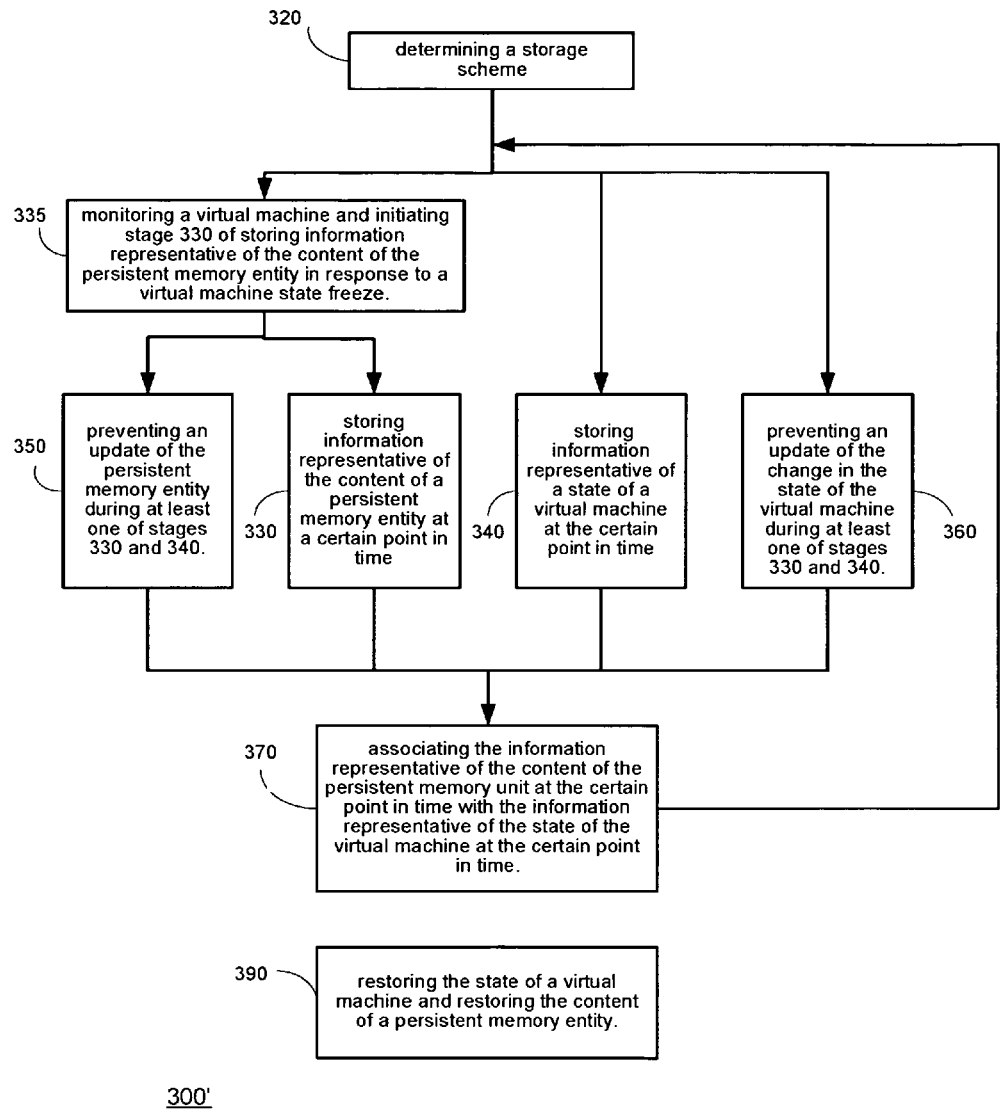
FIG. 9 illustrates a method for storing multiple types of information, according to another embodiment of the invention.

FIG. 9 illustrates a method 300' for storing multiple types of information, according to another embodiment of the invention.

Method 300' differs from method 300 of FIG. 8 by including stage 335 of monitoring a virtual machine and initiating stage 330 of storing information representative of the content of the persistent memory entity in response to a virtual machine state freeze. Stage 320 is followed by stages 335, 340 and 360. Stage 335 is followed by stages 330 and 350. It is noted that the virtual machine state freeze is a controlled, temporary state that a virtual machine can enter and exit.

Figure 10:
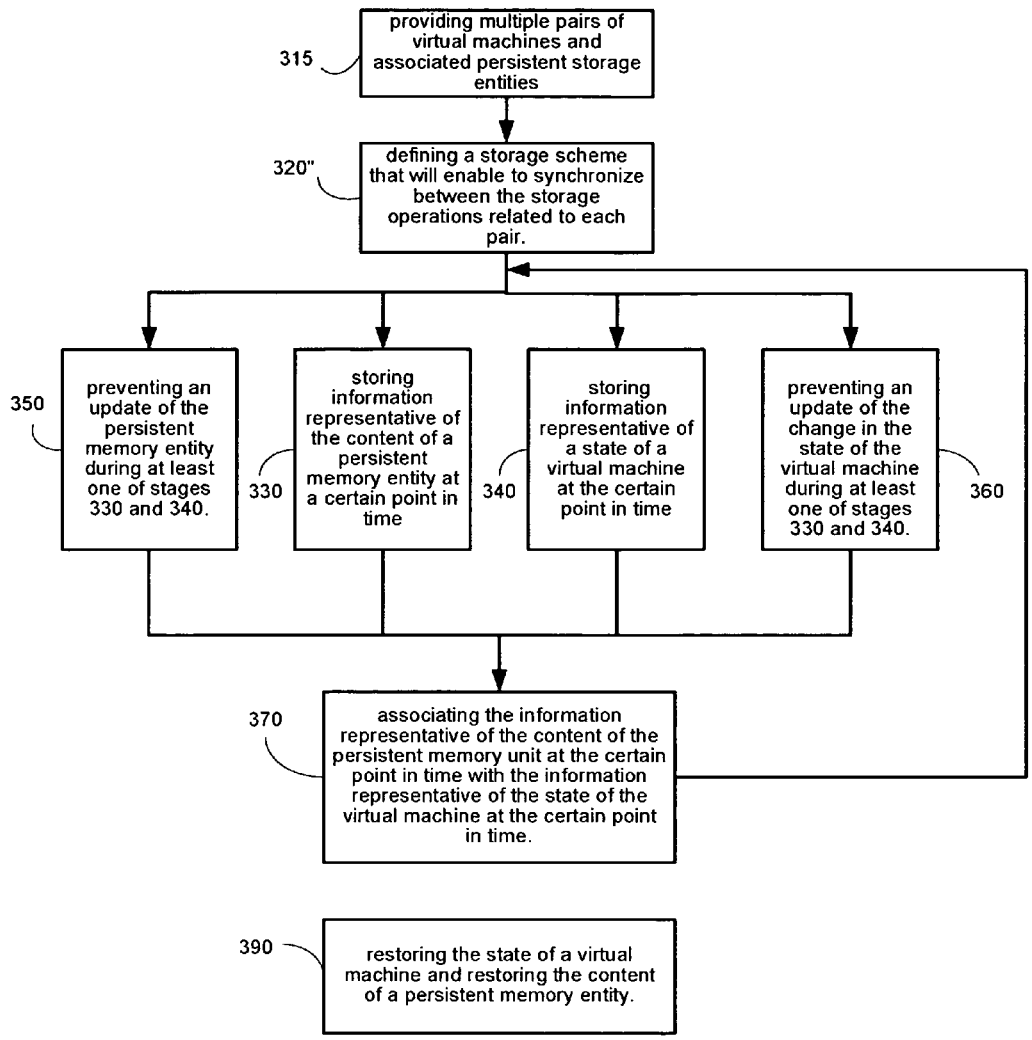
FIG. 10 illustrates a method for storing multiple types of information, according to a further embodiment of the invention.

FIG. 10 illustrates a method 300" for storing multiple types of information, according to a further embodiment of the invention.

Method 300" differs from method 300 of FIG. 8 by storing the states of multiple virtual machines and by storing the content of multiple persistent memory entities. It is noted that each methods out of methods 300, 300' and 300" can be adapted to store the states of multiple virtual machines while storing the content of a single persistent memory entity or to store a state of a virtual machine while storing the content of multiple persistent memory entities.

Method 300" includes stage 315 of providing multiple pairs of virtual machines and associated persistent storage entities.

Stage 315 is followed by stage 320" of defining a storage scheme that will enable to synchronize between the storage operations related to each pair.

Variations, modifications, and other implementations of what is described herein will occur to those of ordinary skill in the art without departing from the spirit and the scope of the invention as claimed.

Accordingly, the invention is to be defined not by the preceding illustrative description but instead by the spirit and scope of the following claims.

We claim:

1. A method for recovering persistent data and non-persistent state information associated with a virtualized machine executed in a computing environment, the method comprising:

storing first information representative of content stored in persistent memory of a computing system, wherein the first information is for restoring the content of the persistent memory at a point in time when the first information was stored on a secondary medium, and wherein the content of the persistent memory comprises long-term data that is not used to restore a state of a virtual machine executed over the computing system; and storing second information representative of a state of a virtual machine executed over the computing system, wherein the second information is for restoring the state of the virtual machine at a point in time when the second information was stored on a secondary medium, wherein the first and second information are stored at approximately a same point in time, such that the first information is stored as a part of a data backup operation of the persistent memory, and the second information is stored as a part of an operation performed to store state of the virtual machine, wherein the data backup operation and the operation to store the state of the virtual machine are performed at approximately the same time, and not in the alternative, by mutually independent and exclusive operations wherein a restore function is configured to restore the state of the virtual machine based on the second information and to restore data stored on the persistent memory entity based on the first information, in response to determining that the computing system over which the virtual machine was executing has failed.

2. The method according to claim 1, further comprising preventing an update of the persistent memory entity during at least one of the storing of the first or second information.

3. The method according to claim 1, further comprising preventing a change in the state of the virtual machine during at least one of the storing of the first or second information.

4. The method according to claim 1, further comprising monitoring the virtual machine and initiating the storing of the first information, in response to a virtual machine state freeze.

5. The method according to claim 1, further comprising synchronizing both of the storing of the first and second information according to storage periods associated with each of the storing of the first and second information.

6. The method according to claim 1, further comprising associating the first information with the second information to simplify recovery of the computing system.

7. The method according to claim 1, wherein the content of the persistent memory entity comprises states of a plurality of virtual machines.

8. The method according to claim 1, wherein the first and second information comprise substantially an entire image of the computing system.

9. The method according to claim 1, wherein each of the storing of the first and second information comprises one or more storage operations.

10. The method according to claim 9, wherein the one or more storage operations comprise at least one of a CDP (continuous data protection) storage operation, a check-point operation, a snapshot operation, or a combination thereof.

11. The method according to claim 9, wherein a first storage operation triggers a second storage operation.

12. The method according to claim 9, wherein the one or more storage operations are listed in one or more data structures stored outside the persistent memory entity and the state of the virtual machine.

13. The method according to claim 12, wherein multiple copies of the data structures are generated.

14. The method according to claim 1, wherein each of the storing of the first and second information is managed by different entities.

15. The method according to claim 1, wherein each of the storing of the first and second information is performed according to a predefined storage scheme.

16. The method according to claim 15, wherein the predefined storage scheme involves at least one of repetitive storage operations, events that trigger storage operations, continuous storage operations, pseudo-random storage operations, or incremental storage operations.

17. The method according to claim 1, wherein the certain point in time is defined by at least one of an application, an end user, a virtual machine, or a hypervisor.

* * * * *